United States Patent
Akaba et al.

(10) Patent No.: US 8,044,323 B2
(45) Date of Patent: Oct. 25, 2011

(54) APPARATUS FOR IMPROVING RESIDUAL STRESS OF PIPING TECHNICAL FIELD

(75) Inventors: Takashi Akaba, Kobe (JP); Shuho Tsubota, Takasago (JP); Kenji Nishikawa, Kobe (JP); Noriaki Sugimoto, Kobe (JP); Shoji Kushimoto, Kobe (JP); Takashi Ishide, Takasago (JP); Takahiro Ohta, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 778 days.

(21) Appl. No.: 10/590,902

(22) PCT Filed: Jul. 28, 2005

(86) PCT No.: PCT/JP2005/013801
§ 371 (c)(1),
(2), (4) Date: Aug. 28, 2006

(87) PCT Pub. No.: WO2006/011539
PCT Pub. Date: Feb. 2, 2006

(65) Prior Publication Data
US 2007/0175873 A1    Aug. 2, 2007

(30) Foreign Application Priority Data

Jul. 29, 2004    (JP) ................................. 2004-222221

(51) Int. Cl.
*B23K 26/02* (2006.01)
*B23K 26/00* (2006.01)
*B23K 9/12* (2006.01)

(52) U.S. Cl. ......... 219/121.78; 219/121.79; 219/121.63; 219/125.11

(58) Field of Classification Search ............. 219/121.78, 219/121.82, 125.11, 121.79, 121.8, 76.1, 219/125.12, 60 A, 60.2; 148/519; 228/29
See application file for complete search history.

(56) References Cited

U.S. PATENT DOCUMENTS 4,438,600 A * 3/1984 Berbakov ................. 219/125.11
(Continued)

FOREIGN PATENT DOCUMENTS

DE          3518882 A1    5/1985
(Continued)

OTHER PUBLICATIONS

International Search Report of PCT/JP2005/013801, date of mailing Oct. 25, 2005.

(Continued)

*Primary Examiner* — Henry Yuen
*Assistant Examiner* — Hung D Nguyen
(74) *Attorney, Agent, or Firm* — Westerman, Hattori, Daniels & Adrian, LLP

(57) ABSTRACT

A weld zone of T-piping and its neighborhood are efficiently laser-heated to remove residual stress. For this purpose, the weld zone of a T-piping (50) is irradiated and heated with a laser beam emitted from a laser head (10) to remove residual stress. At this time, a rotating travel cart (3) travels along a ring rail (2) to adjust the position of the laser head (10) in a θ-direction, a vertical slide (4) slides to adjust the position of the laser head (10) in a Z-direction, a radial slide (5) slides to adjust the position of the laser head (10) in an L-direction, an arcuate piece slide (7) slides along an arcuate piece to adjust the α-direction of the laser head (10), a laser head support portion (9) turns to adjust the β-direction of the laser head (10), and oscillation adjusts the position of the laser head (10) in a γ-direction.

8 Claims, 3 Drawing Sheets

U.S. PATENT DOCUMENTS

| | | | |
|---|---|---|---|
| 4,694,131 A | 9/1987 | Ino et al. | |
| 4,841,123 A * | 6/1989 | Novak et al. | 219/125.12 |
| 5,601,735 A | 2/1997 | Kawamoto et al. | |
| 6,476,345 B1 * | 11/2002 | Sator | 219/121.63 |
| 6,601,426 B2 * | 8/2003 | Wegener | 219/121.63 |
| 2004/0238507 A1 * | 12/2004 | Schadler | 219/121.78 |

FOREIGN PATENT DOCUMENTS

| | | |
|---|---|---|
| EP | 0 941 815 A2 | 9/1999 |
| ES | 550417 A | 12/1985 |
| IT | 1185605 B | 12/1987 |
| JP | 53115640 A * | 10/1978 |
| JP | 57195583 A * | 12/1982 |
| JP | 58-170177 U | 11/1983 |
| JP | 59150675 A * | 8/1984 |
| JP | 60-087989 A | 5/1985 |
| JP | 60-255930 A | 12/1985 |
| JP | 8-19881 A | 1/1996 |
| JP | 9-52186 A | 2/1997 |
| JP | 2001-150178 A | 6/2001 |
| JP | 2004-130314 A | 4/2004 |
| JP | 2005-232586 A | 9/2005 |
| SE | 8502645-8 A | 12/1985 |

OTHER PUBLICATIONS

Supplementary European Search Report dated Jul. 4, 2011, issued in corresponding European Patent Application No. 05767038.2.

* cited by examiner

US 8,044,323 B2

APPARATUS FOR IMPROVING RESIDUAL STRESS OF PIPING TECHNICAL FIELD

TECHNICAL FIELD

This invention relates to an apparatus for improving the residual stress of piping and, more particularly, to an apparatus for improving the residual stress of piping which is used to decrease the residual stress of a T-piping having the shape of the letter T.

BACKGROUND ART

When piping is installed in a large plant such as a nuclear power plant, residual stress of tension generated in the inner peripheral surface of the piping poses a problem. When pipings are connected by welding, for example, residual stress occurs in the weld zone of the pipings, and stress-corrosion cracking (SCC) is caused to the piping by the residual stress, potentially shortening the life of the piping. Thus, it is desirable to reduce the residual stress generated in the piping by welding or the like.

Japanese Patent Application Laid-Open No. 2001-150178 (Patent Document 1) discloses an apparatus for improving residual stress of piping, which is designed to reduce residual stress in the vicinity of a weld zone of piping by heating. This apparatus, which is publicly known, is equipped with an arc generating ring located on the outer periphery of piping, and a first ring coil and a second ring coil arranged on the outer periphery of the piping above and below the arc generating coil, respectively. When a magnetic field is generated by the ring coils, an arc occurs between the arc generating ring and the piping to heat the piping. Since the piping is heated, the residual stress of the piping is reduced.

Japanese Patent Application Laid-Open No. 1996-19881 (Patent Document 2) discloses a technique for surface machining the inner surface of piping by irradiating the inner surface of the piping with laser light. According to this technique, which is publicly known, laser light is guided into the piping by an optical fiber, whereafter the laser light is delivered from the optical fiber, and directed at the inner surface of the piping.

A method of stress removal by high frequency heating is widely known. However, the method using high frequency heating has the problems that it involves a large-scale apparatus, supply power for a high frequency wave is very great, and the interior of target piping needs to be cooled.

One of requirements of an apparatus for improving the residual stress of piping, which is used for removing residual stress, is to be able to heat a wide range of the surface of the piping uniformly. The ability to heat a wide range of the surface of the piping is important for increasing a throughput and ensuring residual stress removing performance. The ability to heat the piping uniformly, on the other hand, is important to render residual stress, which remains after heat-treatment, low. Fulfilling this requirement is not easy if the piping has a complicated shape, for example, if the piping is branched, or if a thick-walled pipe is targeted and, particularly, its broad range needs to be heated.

Against such a background, there is a demand for the provision of an apparatus for improving the residual stress of piping, which can uniformly heat a wide range of the surface of piping and, especially, can uniformly heat a wide range of the surface of piping even if the piping has a complicated shape, such as a T-piping.

Patent Document 1: Japanese Patent Application Laid-Open No. 2001-150178
Patent Document 2: Japanese Patent Application Laid-Open No. 1996-19881

DISCLOSURE OF THE INVENTION

Problems To Be Solved By The Invention

It is an object of the present invention to provide an apparatus for improving the residual stress of piping, which is preferred for uniformly heating, from the outer surface side, a wide range (a weld zone and its vicinity) of the surface of a T-piping in the shape of the letter T.

Means For Solving The Problems

A feature of the present invention, for solving the above-mentioned problems, is an apparatus for improving residual stress of piping, which irradiates an outer surface of a T-piping with a laser beam emitted from a laser head, the T-piping comprising a first piping having one end welded and connected to a tubular circumferential surface of a second piping, and characterized by having a circumferential position adjusting structure for moving the laser head along a circumferential direction about a tubular axis of the first piping.

Another feature of the present invention is an apparatus for improving residual stress of piping, which irradiates an outer surface of a T-piping with a laser beam emitted from a laser head, the T-piping comprising a first piping having one end welded and connected to a tubular circumferential surface of a second piping, and comprising:
a circumferential-direction position adjusting structure for moving the laser head along a circumferential direction about a tubular axis of the first piping;
a tubular axial-direction position adjusting structure for moving the laser head along a tubular axial direction of the first piping;
a radial-direction position adjusting structure for moving the laser head along a radial direction of the first piping; and
an emission-direction adjusting structure for changing an emission direction of a laser beam in a plane including the tubular axis of the first piping, by changing a direction of the laser head.

Another feature of the present invention is an apparatus for improving residual stress of piping, which irradiates an outer surface of a T-piping with a laser beam emitted from a laser head, the T-piping comprising a first piping having one end welded and connected to a tubular circumferential surface of a second piping, and comprising:
a circumferential-direction position adjusting structure for moving the laser head along a circumferential direction about a tubular axis of the first piping;
a tubular axial-direction position adjusting structure for moving the laser head along a tubular axial direction of the first piping;
a radial-direction position adjusting structure for moving the laser head along a radial direction of the first piping;
a first emission-direction adjusting structure for changing an emission direction of a laser beam in a plane including the tubular axis of the first piping, by changing a direction of the laser head; and
a second emission-direction adjusting structure for changing an emission direction of a laser beam in a plane intersecting the plane including the tubular axis of the first piping, by changing a direction of the laser head.

Another feature of the present invention is characterized in that the laser head is provided in a laser head support portion so as to be moved in an oscillatory manner, or a plurality of the laser head are provided in the laser head support portion.

Effects of the Invention

According to the present invention, a laser beam can be directed toward the weld zone of the T-piping, namely, a zone where the first piping and the second piping are welded and connected together. Thus, residual stress generated in the T-piping owing to welding can be effectively removed.

DESCRIPTION OF THE NUMERALS

Figure 1:
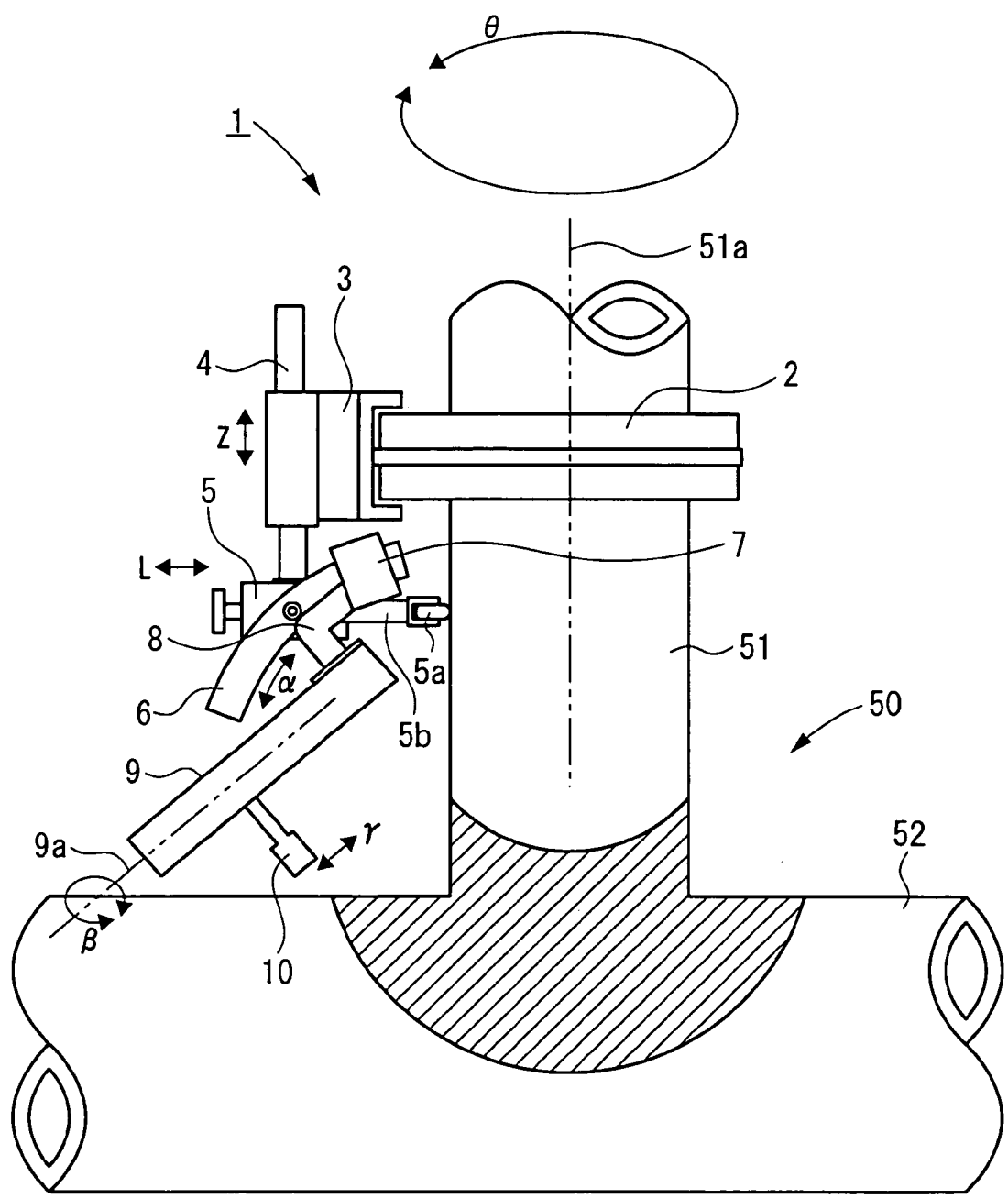
[FIG. 1] is a configurational drawing showing a pipe heating device according to Example 1 of the present invention.

1 Apparatus for improving residual stress of piping
2 Ring rail
3 Rotating travel cart
4 Vertical slide
5 Radial slide
6 Arcuate piece
7 Arcuate piece slide
8 Connecting material
9 Laser head support portion
10 Laser head
11 Optical fiber
50 T-piping
51 First piping
52 Second piping

BEST MODE FOR CARRYING OUT THE INVENTION

Hereinbelow, embodiments of the present invention will be described in detail based on Examples.

EXAMPLE 1

Figure 2:
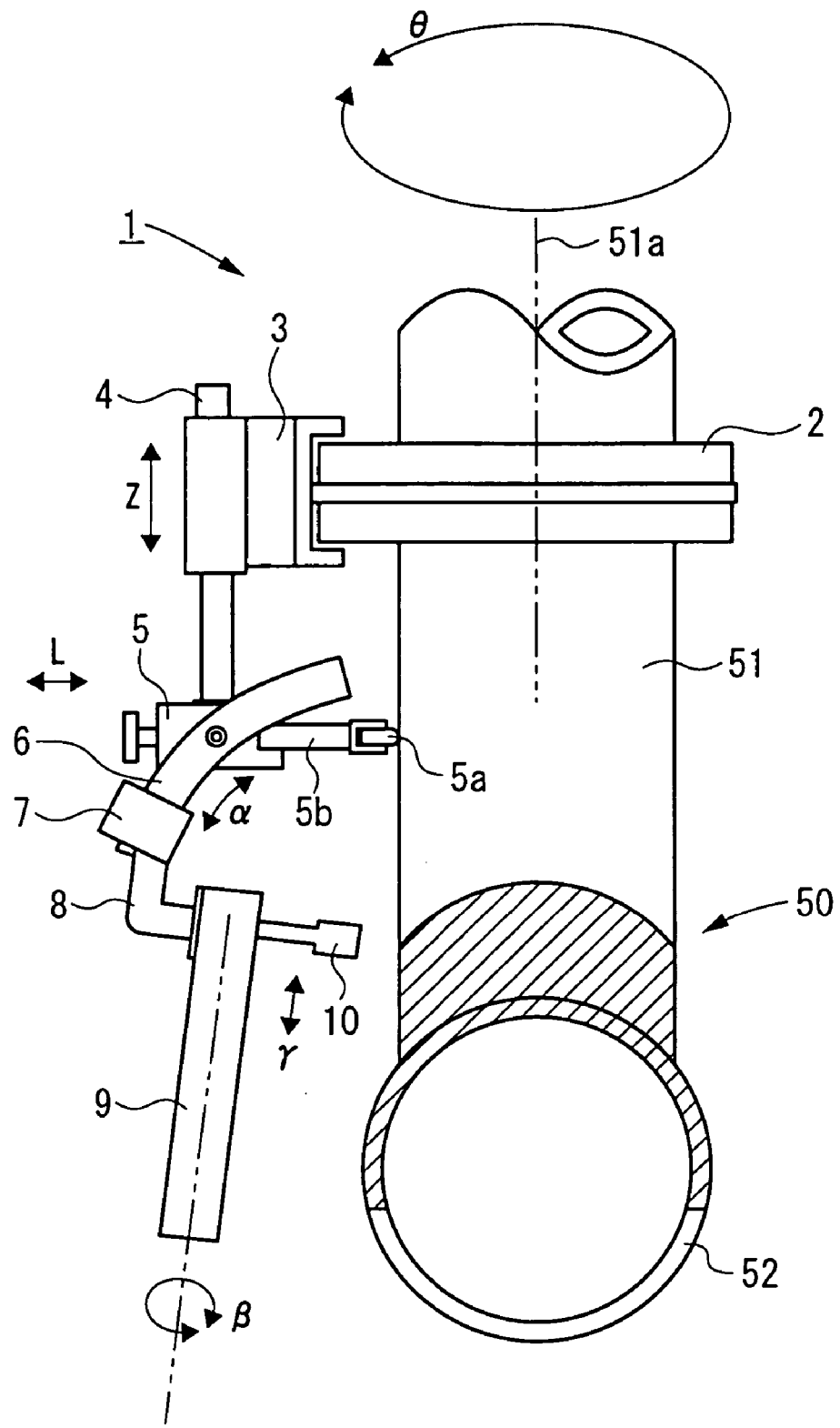
[FIG. 2] is a configurational drawing showing the pipe heating device according to Example 1 of the present invention.

FIGS. 1 and 2 show an apparatus for improving the residual stress of piping according to Example 1 of the present invention. FIGS. 1 and 2 are displaced by 90 degrees in terms of the direction of drawing, and are also different in the slide position of an arcuate piece slide 7 and in the position of oscillatory movement of a laser head 10.

The apparatus 1 for improving the residual stress of piping is designed to heat a T-piping 50. The T-piping 50 is a T-shaped piping produced by welding and connecting one end of a first piping 51 to the tubular circumferential surface of a second piping 52. The apparatus 1 for improving the residual stress of piping heats the weld zone of the T-piping 50 and its neighborhood (a shaded area in FIG. 1) to reduce residual stress.

A ring rail 2 of the apparatus 1 for improving the residual stress of piping is mounted on the first piping 51 so as to surround the periphery of this piping 51. The ring rail 2 is composed of, for example, two semi-arcuate rail members. The ring-shaped ring rail 2 is mounted on the piping 51 by coupling the semi-arcuate rail members together, with the piping 51 being sandwiched therebetween.

A rotating travel cart 3 travels along the circumferential surface of the ring rail 2. That is, the rotating travel cart 3 travels on the ring rail 2 as a track, while engaging the ring rail 2. Thus, the rotating travel cart 3 travels and moves along a circumferential direction ($\theta$ direction) about the tubular axis 51a of the piping 51. The travel of the rotating travel cart 3 is carried out by driving a drive device, such as a motor, provided in the rotating travel cart 3. Moreover, the driving and stoppage of this drive device are controlled by a controller (not shown).

The ring rail 2 and the rotating travel cart 3 mentioned above constitute a circumferential-direction position adjusting structure which moves the laser head 10 along the circumferential direction about the tubular axis 51a.

A vertical slide 4 can slidingly move along a vertical direction (the direction of the tubular axis 51a of the piping 51, namely, a Z-direction) while being supported by an outer peripheral portion of the rotating travel cart 3. The sliding movement of the vertical slide 4 is made by driving a drive device, such as a motor, provided in the vertical slide 4. Moreover, the driving and stoppage of this drive device are controlled by a controller (not shown).

The vertical slide 4 serves as a tubular axial-direction position adjusting structure which moves the laser head 10 along the direction of the tubular axis 51a.

A radial slide 5 can slidingly move along a direction, in which it approaches and leaves the piping 51 (the radial direction of the piping 51, namely, an L-direction), while being supported by a lower end portion of the vertical slide 4 (an end portion beside the piping 52). A portion of the radial slide 5, which faces the piping 51, is provided with a front end guide roller 5a making rolling contact with the circumferential surface of the piping 51. A support portion 5b supporting the front end guide roller 5a is fixed to the vertical slide 4, and the radial slide 5 can slidingly move in the L-direction with respect to the support portion 5b. The sliding movement of the radial slide 5 is made by driving a drive device, such as a motor, provided in the radial slide 5. Moreover, the driving and stoppage of this drive device are controlled by a controller (not shown).

The radial slide 5 serves as a radial-direction position adjusting structure which moves the laser head 10 along the radial direction of the piping 51.

An arcuate piece 6 of an arcuate shape is fixed to the radial slide 5, and an arcuate piece slide 7 can slidingly move along this arcuate piece 6 in an arcuate manner (an $\alpha$-direction). A laser head support portion 9 is mounted on the arcuate piece slide 7 via a coupling material 8. Thus, the arcuate piece slide 7, the coupling material 8, and the laser head support portion 9 can integrally move along the arcuate piece 6 in the $\alpha$-direction. The sliding movement of the arcuate piece slide 7 is made by driving a drive device, such as a motor, provided in the arcuate piece slide 7. Moreover, the driving and stoppage of this drive device are controlled by a controller (not shown).

The arcuate piece 6 and the arcuate piece slide 7 mentioned above constitute a first emission-direction adjusting structure which changes the emission direction of a laser beam emitted from the laser head 10.

The laser head support portion 9 is mounted on the coupling material 8 so as to be capable of turning about an axis 9a as the center of rotation (i.e., rotating in a β-direction). The rotation of the laser head support portion 9 in the β-direction is made by driving a drive device, such as a motor, provided in the laser head support portion 9. Moreover, the driving and stoppage of this drive device are controlled by a controller (not shown).

Since the laser head support portion 9 is adapted to be capable of rotation in the β-direction, a second emission-direction adjusting structure, which changes the emission direction of the laser beam emitted from the laser head 10, is constituted.

The laser head support portion 9 is equipped with the laser head 10. The laser head 10 is adapted to make an oscillatory movement (reciprocating movement) along the direction of the axis 9a of the laser head support portion 9 (i.e., a γ-direction). That is, an oscillating device composed of a linear motor or the like is installed in the laser head support portion 9, and the laser head 10 is moved in an oscillatory manner in the γ-direction by driving the oscillating device. The driving and stoppage of the oscillating device are controlled by a controller (not shown).

A laser beam is supplied from a laser oscillator to the laser head 10 via optical fibers. This laser beam is applied from the laser head 10 toward the outer surface of the T-piping 50. By adjusting the position of application as will be described later, therefore, the laser beam is applied to the weld zone of the T-piping 50 and its neighboring area to heat them, thereby enabling residual stress to be reduced.

The position of the laser head 10, accordingly, the position of application of the laser beam to the T-piping 50 is adjusted in the following manner under control of the controller:

By allowing the rotating travel cart 3 to travel on the ring rail 2 as the track, the position of the laser head 10 in the circumferential direction (the position in the θ-direction) can be changed and adjusted.

By moving the vertical slide 4 slidingly, the position of the laser head 10 in the vertical direction (the position in the Z-direction) can be changed and adjusted.

By moving the radial slide 5 slidingly, the position of the laser head 10 in the radial direction (the position in the L-direction) can be changed and adjusted.

By moving the arcuate piece slide 7 slidingly along the arcuate piece 6, the direction of the laser head 10 with respect to the α-direction can be changed and adjusted. In other words, the direction of emission of the laser beam emitted from the laser head 10 can be changed and adjusted in a plane including the tubular axis 51a of the piping 51 and the axis 9a of the laser head support portion 9.

By rotating the laser head support portion 9 in the β-direction, the direction of the laser head 10 with respect to the β-direction can be changed and adjusted. In other words, the direction of emission of the laser beam emitted from the laser head 10 can be changed and adjusted in a plane orthogonal to the plane including the tubular axis 51a of the piping 51 and the axis 9a of the laser head support portion 9.

After all, the direction of emission of the laser beam can be changed and adjusted to an arbitrary direction by adjusting the direction of the laser head 10 with respect to the α-direction and the direction of the laser head 10 with respect to the β-direction which is the direction orthogonal to the α-direction.

In the present Example, the α-direction and the β-direction are orthogonal to each other, but this is not limitative. Generally speaking, there may be provided the first emission-direction adjusting structure for changing and adjusting the emission direction of the laser beam in the plane including the tubular axis 51a, and the second emission-direction adjusting structure for changing and adjusting the emission direction of the laser beam in the plane intersecting (optionally, perpendicularly intersecting) the plane including the tubular axis 51a. By providing such first and second emission-direction adjusting structures, the direction of emission of the laser beam can be changed and adjusted to an arbitrary direction.

By moving the laser head 10 in an oscillatory manner in the γ-direction, the laser beam can be scanned in the γ-direction.

By adjusting the positions of θ, Z, L and the directions of α, β, γ, as described above, the laser beam emitted from the laser head 10 can be effectively applied to the weld position and its neighborhood. That is, by adjusting the positions of θ, Z, L and the directions of α, β, γ, the laser beam can be applied to the weld position of the T-piping 50 and all regions in its neighborhood. Also, the laser beam can be rendered incident on the position of application at right angles or at an angle close to a right angle. Thus, effective heating can be performed. Furthermore, the output of the laser oscillator may be controlled such that the intensity of the laser beam emitted from the laser head 10 is varied according to the position of application.

EXAMPLE 2

Figure 3A:
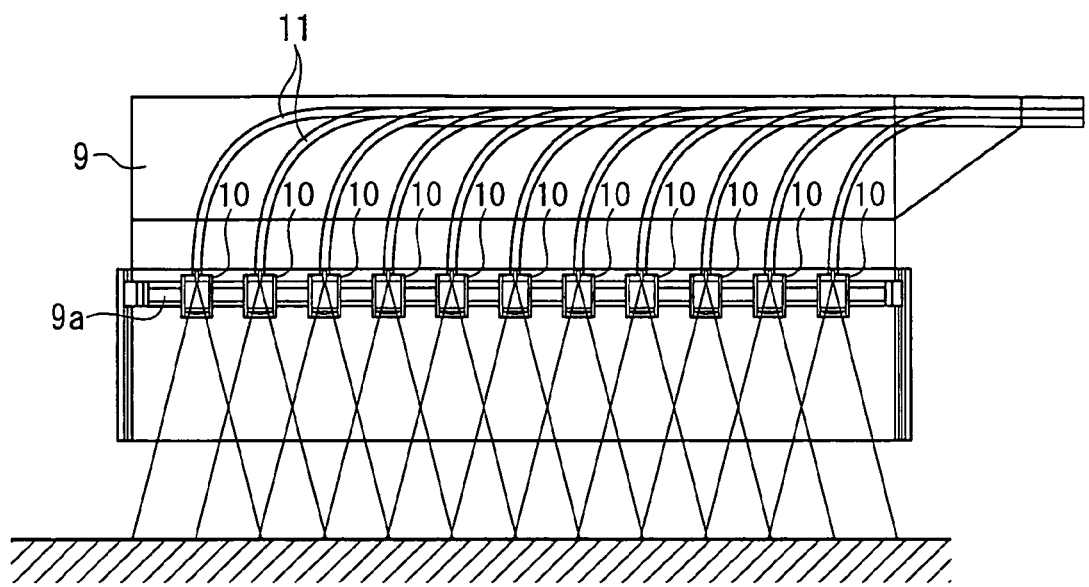
[FIG. 3(a)] is a configurational drawing showing a multiple-type laser head.
Figure 3B:
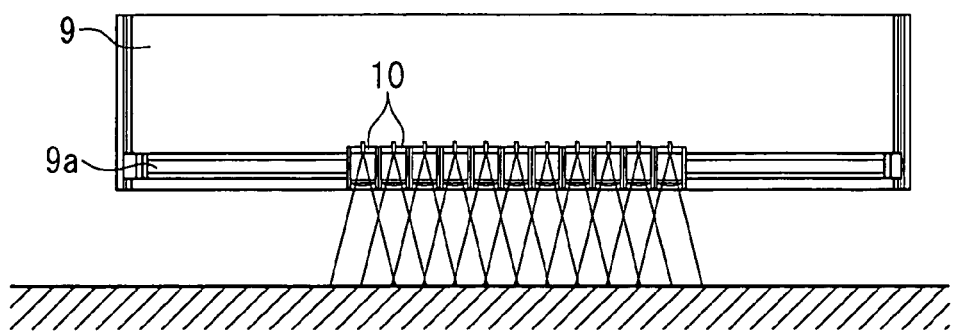
[FIG. 3(b)] is a configurational drawing showing the multiple-type laser head.

In Example 1, the laser head 10 which moves in an oscillatory manner is provided in the laser head support portion 9. In Example 2, a multiple-type laser head as shown in FIGS. 3(*a*), 3(*b*) is used. With the multiple-type laser head, a plurality of the laser heads 10 are movably mounted on a slide member 9a of the laser head support portion 9. The spacing between the plural laser heads 10 can be adjusted in such a manner as to be wide as shown in FIG. 3(*a*), or narrow as shown in FIG. 3(*b*). In FIG. 3(*a*), optical fibers 11 are shown, but in FIG. 3(*b*), the optical fibers are not shown.

The features of other portions are the same as those in Example 1.

In Example 1 mentioned above, the position adjusting structures for adjusting the positions of θ, Z, L and the directions of α, β, γ are adopted. In Example 2 above, the position adjusting structures for adjusting the positions of θ, Z, L and the directions of α, β are adopted. However, it is possible to adopt position adjusting structures for adjusting only the position of θ, position adjusting structures for adjusting only the positions of θ, Z, L, or position adjusting structures for adjusting the positions of θ, Z, L and the direction of α.

INDUSTRIAL APPLICABILITY

The present invention can be used for reducing residual stress generated in a large T-piping used in a large plant.

The invention claimed is:

1. An apparatus for improving residual stress of piping, which irradiates an outer surface of a T-piping with a laser beam emitted from a laser head, said T-piping comprising a first piping having one end welded and connected to a tubular circumferential surface of a second piping, and comprising:
a circumferential-direction position adjusting structure for moving the laser head along a circumferential direction about a tubular axis of the first piping;
a tubular axial-direction position adjusting structure for moving the laser head along a tubular axial direction of the first piping;
a radial-direction position adjusting structure for moving the laser head along a radial direction of the first piping; and an emission-direction adjusting structure for changing an emission direction of the laser beam in a plane including the tubular axis of the first piping, by changing a direction of the laser head, wherein the circumferential-direction position adjusting structure includes a rail mounted on a surface of the first piping, wherein the rail includes a ring shape surrounding a periphery of the first piping, wherein the circumferential-direction position adjusting structure further includes a cart traveling on the ring-shaped rail as a track, wherein the radial-direction position adjusting structure includes a guide roller making a rolling contact with a circumferential surface of the first piping, wherein the radial-direction position adjusting structure includes a support portion fixed to one end of the tubular axial-direction position adjusting structure, the support portion extending in the radial direction of the first piping and supporting the guide roller at one end thereof, the one end of the support portion facing the first piping, and wherein the radial-direction position adjusting structure slidingly moves along the radial direction of the first piping, with respect to the support portion.

2. An apparatus for improving residual stress of piping, which irradiates an outer surface of a T-piping with a laser beam emitted from a laser head, said T-piping comprising a first piping having one end welded and connected to a tubular circumferential surface of a second piping, and comprising:
a circumferential-direction position adjusting structure for moving the laser head along a circumferential direction about a tubular axis of the first piping;
a tubular axial-direction position adjusting structure for moving the laser head along a tubular axial direction of the first piping;
a radial-direction position adjusting structure for moving the laser head along a radial direction of the first piping;
a first emission-direction adjusting structure for changing an emission direction of the laser beam in a plane including the tubular axis of the first piping, by changing a direction of the laser head; and
a second emission-direction adjusting structure for changing the emission direction of the laser beam in a plane intersecting the plane including the tubular axis of the first piping, by changing the direction of the laser head,
wherein the circumferential-direction position adjusting structure includes a rail mounted on a surface of the first piping,
wherein the rail includes a ring shape surrounding a periphery of the first piping, and wherein the circumferential-direction position adjusting structure further includes a cart traveling on the ring-shaped rail as a track, wherein the radial-direction position adjusting structure includes a guide roller making a rolling contact with a circumferential surface of the first piping, wherein the radial-direction position adjusting structure includes a support portion fixed to one end of the tubular axial-direction position adjusting structure, the support portion extending in the radial direction of the first piping and supporting the guide roller at one end thereof, the one end of the support portion facing the first piping, and wherein the radial-direction position adjusting structure slidingly moves along the radial direction of the first piping, with respect to the support portion.

3. The apparatus for improving residual stress of piping according to claim 1 or 2, characterized in that
a plurality of the laser heads are provided in a laser head support portion.

4. The apparatus for improving residual stress of piping according to claim 1 or 2, wherein the ring-shaped rail comprises two semi-arcuate rail members.

5. The apparatus for improving residual stress of piping according to claim 1 or 2, wherein the cart travels along a circumferential surface of the ring-shaped rail.

6. The apparatus for improving residual stress of piping according to claim 1, wherein the emission-direction adjusting structure includes a slide and an arcuate-shaped piece,
wherein the arcuate-shaped piece is fixed to the radial-direction position adjusting structure and aligned with the plane including the tubular axis of the first piping, and
wherein the slide slidingly moves along the arcuate-shaped piece in an arcuate manner.

7. The apparatus for improving residual stress of piping according to claim 1 or 2, characterized in that
the laser head is provided in a laser head support portion so as to be moved in an oscillatory manner.

8. The apparatus for improving residual stress of piping according to claim 2, wherein the first emission-direction adjusting structure includes a slide and an arcuate-shaped piece,
wherein the arcuate-shaped piece is fixed to the radial-direction position adjusting structure and aligned with the plane including the tubular axis of the first piping, and
wherein the slide slidingly moves along the arcuate-shaped piece in an arcuate manner.

* * * * *